United States Patent [19]

Polashak

[11] 4,092,770

[45] June 6, 1978

[54] CLUTCH ASSEMBLY-DISASSEMBLY TOOL

[75] Inventor: Gerald L. Polashak, Jackson, Mich.

[73] Assignee: Clark Equipment Company, Buchanan, Mich.

[21] Appl. No.: 811,332

[22] Filed: Jun. 29, 1977

[51] Int. Cl.² .......................................... B23P 19/04
[52] U.S. Cl. .................................................. 29/263
[58] Field of Search ................... 29/263, 256, 258, 259

[56] References Cited

U.S. PATENT DOCUMENTS 4,034,458  7/1977  Ford et al. ............................ 29/259

FOREIGN PATENT DOCUMENTS 293,599  1/1966  Australia ............................... 29/256

Primary Examiner—James L. Jones, Jr.
Attorney, Agent, or Firm—Ernst H. Ruf

[57] ABSTRACT

A manually operable clutch assembly-disassembly tool that is utilized with multiple plate, fluid-actuated-type clutches wherein it is necessary to compress a piston return spring so as to permit either the insertion or removal of a snap ring in assembling and disassembling of the clutch, with the tool being affixable to the clutch and having an inner annular member that is axially displaceable, via displacement means, relative to an outer annular member attached to the clutch drum, thereby compressing the piston return spring and permitting insertion or removal of the snap ring.

7 Claims, 4 Drawing Figures

CLUTCH ASSEMBLY-DISASSEMBLY TOOL

BACKGROUND OF THE INVENTION

1. Field Of The Invention

The field of art to which this invention pertains is that of multiple plate fluid-pressure actuated type of clutches used in power-shift transmissions, and, more particularly, to a tool used for compressing piston return springs so as to permit the ready manual insertion or removal of a snap ring that secures the piston return spring retainer cup.

2. Description Of The Prior Art

Constant-mesh powershift transmissions of the type shown, for example, in prior U.S. Pat. No. 3,893,345 generally utilize multiple plate, fluid-actuated clutches. These clutches generally include an internally splined drum affixed to a first rotatable transmission member, an externally splined hub affixed to a second rotatable transmission member and a plurality of interleaved friction plates splined alternately to the hub and drum. The friction plates are confined between an annular end plate and a fluid pressure actuated piston which serves to press the friction plates together, thereby connecting the hub and drum for conjoint rotation in a manner well known in the art. Generally, the piston is biased in the direction away from the friction plates via a piston return spring confined between the piston and an annular spring retainer cup that is secured against axial movement by a snap ring located in a snap ring groove in the first rotatable transmission member.

The force of the clutch return spring, which is generally from 100 to 150 pounds, must be overcome in order to install the retainer cup snap ring. Prior art assembly or disassembly of this type of fluid actuated type clutch involves removing the entire clutch from the transmission and then, after further removal of the interleaved friction plates, inserting the clutch assembly onto an arbor press and compressing the spring by the use of a cylindrical sleeve which has an opening through which a snap ring removal tool can be manually inserted for removing, or in the case of assembly, inserting the snap ring.

Since it is a common practice to service these transmissions and clutches in the field, arbor presses are not always readily available. In addition, in some instances, it would be possible to service the clutch without removing it from the transmission if it were possible to add or remove the snap ring and clutch piston return spring without the use of an arbor press.

SUMMARY OF THE INVENTION

The clutch assembly-disassembly tool of this invention solves the previously noted problems of ready serviceability in that the tool is readily portable; can be used in combination with merely a wrench; and can be used on the clutch after it is removed from the transmission, as well as being usable, in some instances, without removing the clutch from the transmission itself.

In summary, the clutch assembly-disassembly tool of this invention includes an outer annular member that has external splines and which is adapted to fit within and intermesh with the internally splined clutch drum. An externally expanding split retainer ring is adapted to fit within a retainer ring groove of the clutch drum and restrains the outer annular member against axial movement out of the drum. For ease of operation, the adjacent end portions of the split retainer ring are provided with a pair of parallel and axially extending grip portions so as to permit ready manual manipulation thereof. Fitting within the outer annular member is an inner annular member that is adapted to seat on the spring retainer cup and means are provided for displacing the inner annular member axially inwardly relative to the outer annular member so as to thereby compress and axially displace the piston return spring to permit ready access to the snap ring.

In operation, the assembly-disassembly tool of this invention is affixed to the clutch, with actuation of the displacement means, via a wrench, compressing the return spring by axially inwardly displacing the snap ring cup so as to thereby relieve the end thrust of the cup against the snap ring and permit the ready manual insertion or removal of the snap ring. The same basic operation sequence is used whether it is desired to assemble or disassemble the clutch.

Other features and advantages of the invention will become more readily understood by persons skilled in the art when following the detailed description in conjunction with the drawings.

BRIEF DESCRIPTION OF THE DRAWINGS

FIG. 3 is a longitudinal view, partly in section, of the clutch assembly-disassembly tool secured to the drum of a fluid-actuated type clutch after the removal of the clutch from the transmission shown in FIG. 1, with the clutch assembly-disassembly tool being shown in the inoperative or at-rest position.

FIG. 4 is a view similar to that of FIG. 3 with the clutch assembly-disassembly tool being shown in its operative or applied position.

DESCRIPTION OF THE PREFERRED EMBODIMENT

Figure 1:
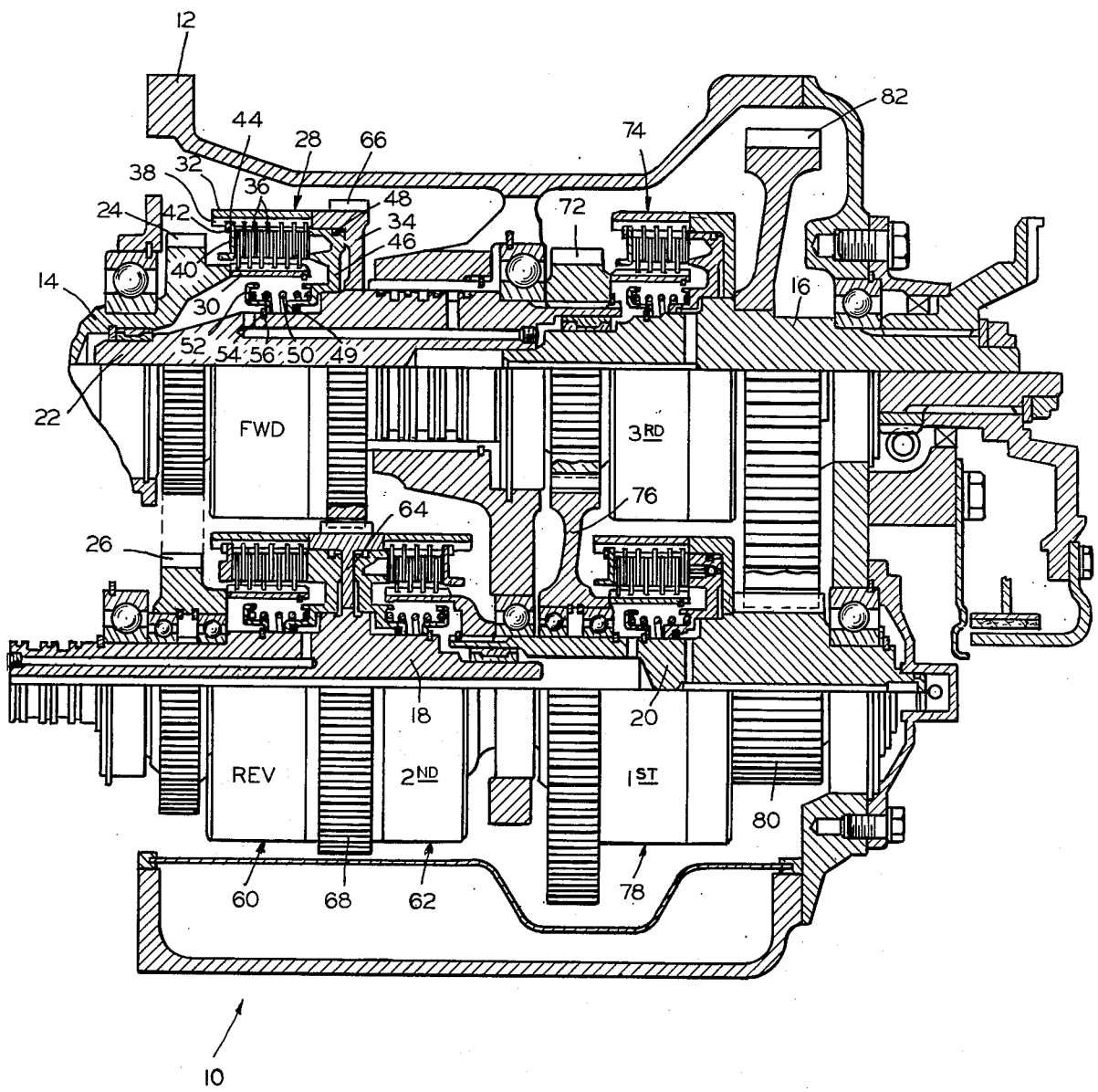
FIG. 1 is a longitudinal sectional view of an in-line three speed powershift transmission that has a plurality of fluid-actuated type of clutches with which the assembly-disassembly tool of this invention finds utility.
Figure 2:
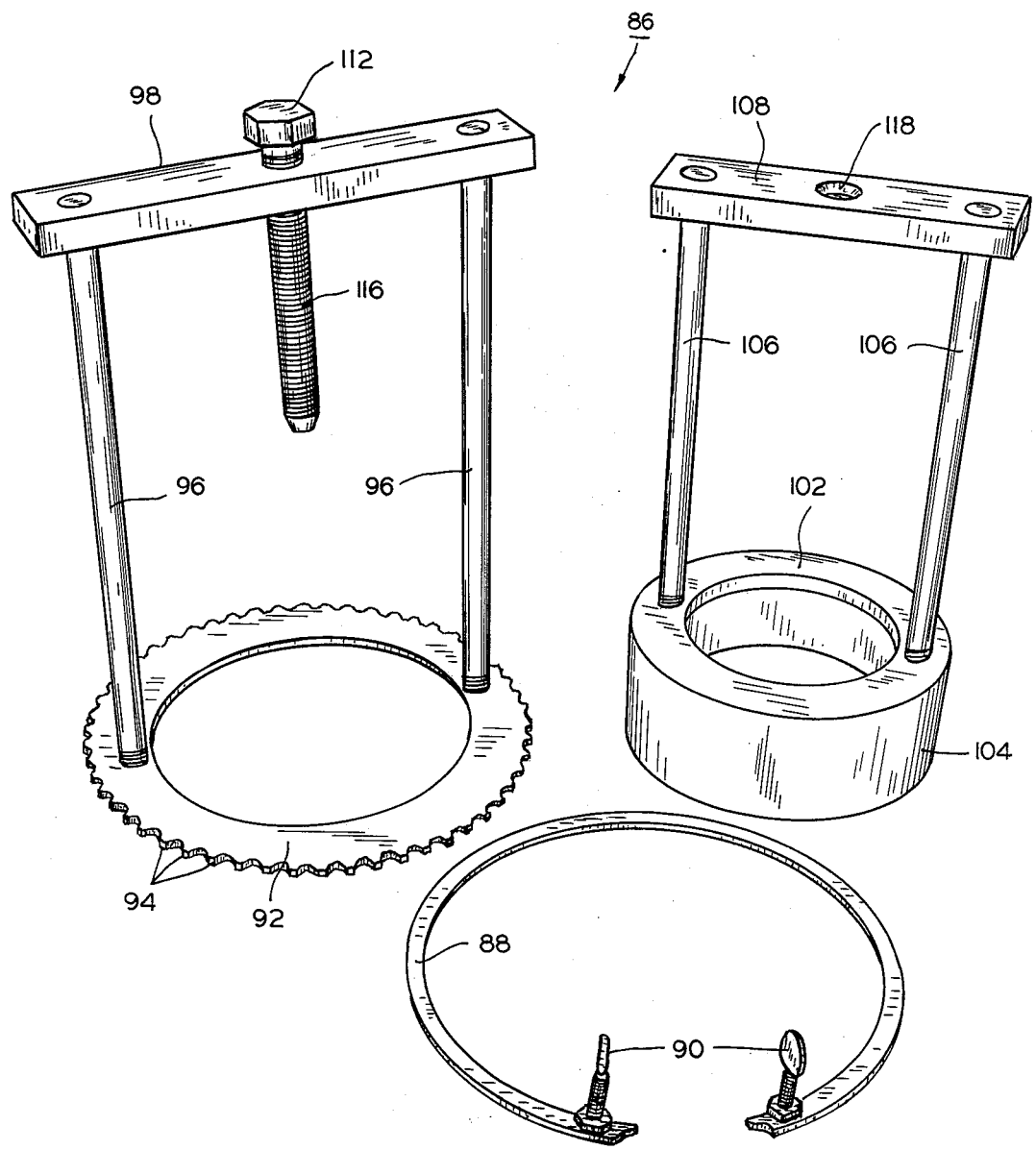
FIG. 2 is a perspective view of the component parts of the hydraulic clutch assembly-disassembly tool.

Referring now to FIG. 1, the reference numeral 10 generally denotes a transmission of the constant-mesh-gear powershift type, having a housing 12 in which an input shaft 14, output shaft 16 as well as shafts 18, 20 and 22 are journalled for rotation.

While transmission 10 is substantially similar to transmission 130 (FIG. 7) shown and described in prior U.S. Pat. No. 3,893,345 (also assigned to the assignee of this invention), for ease of understanding, the description of this stucture and function will be substantially repeated herein.

Input shaft 14 is driven by means of a hydrodynamic torque converter (not shown) of known construction to which shaft 14 is connected, with the torque converter being in turn connected to any suitable source of power, such as an internal combustion engine (not shown). In addition, the torque converter impeller drives one or more pumps (not shown), of well known construction, to provide pressurized fluid to operate the various fluid actuated clutches, as well as lubricate the gears and bearings associated with transmission 10.

Connected to input shaft 14 is a gear 24 which is drivingly connected by means of an idler gear (not shown) with a gear 26, with gear 26 being journalled for rotation on shaft or countershaft 18. Shaft 22, is axially aligned with input shaft 14, can be connected thereto, Turning now to FIG. 4, it should be clear that further rotary movement of bolt 112, such as via a wrench, in an inwardly direction, will axially displace inner annular member 102 away from outer annular member 92 thereby compressing return spring 50 by axially inwardly displacing snap ring cup 52 and thereby relieve the end thrust of cup 52 against snap ring 54 in groove 56 of shaft 22 so as to permit the ready manual removal therefrom of snap ring 54. After the removal of ring 54, rotary movement of bolt 112 in an outwardly direction will relieve the pressure of spring 50 and permit the detachment of tool 86 from clutch 28. It should also be understood that the same basic operational sequence is used whether it is desired to remove snap ring 54 to permit the removal of spring retaining cup 52 or to add snap ring 54 so as to confine retaining cup 52 after the replacement of piston seal rings 48 and 49.

It is the function of bridging members 98 and 108, and their support members (96 and 106, respectively) together with bolt 112 to function as means for displacing inner annular member 102 axially inwardly (toward piston 46) within clutch drum 32 relative to outer annular member 92, thereby compressing and axially displacing piston return spring 50 so as to permit the ready removal or insertion of snap ring 54 relative to snap ring groove 56.

Tool 86 may, of course, be so constructed that it can be completely dismantled, i.e., that the support members can be removed from both the annular members and the bridging members, for ready portability for field use where arbor presses or the like are not readily available. It should also be understood that tool 86 can be used on differing clutch sizes by having varying sizes of inner and outer annular members as well as differing sizes of retainer rings 88.

It should be apparent that the clutch assembly-disassembly tool of this invention provides a very simple as well as portable tool that is easy to operate, inexpensive to manufacture and obviates the need for an arbor press when rebuilding clutches of the type previously described herein.

From the foregoing, it is believed that those familiar with the art will recognize and appreciate the novel concepts and features of the present invention. Obviously, while the invention has been described in relation to but a single embodiment, numerous variations, changes and substitutions of equivalents will present themselves to persons skilled in the art and may be made without necessarily departing from the scope and principles of this invention. As a result, the embodiment described herein is subject to various modifications, changes and the like, without departing from the scope and spirit of the invention, with the scope thereof being determined solely by reference to the claims appended hereto.

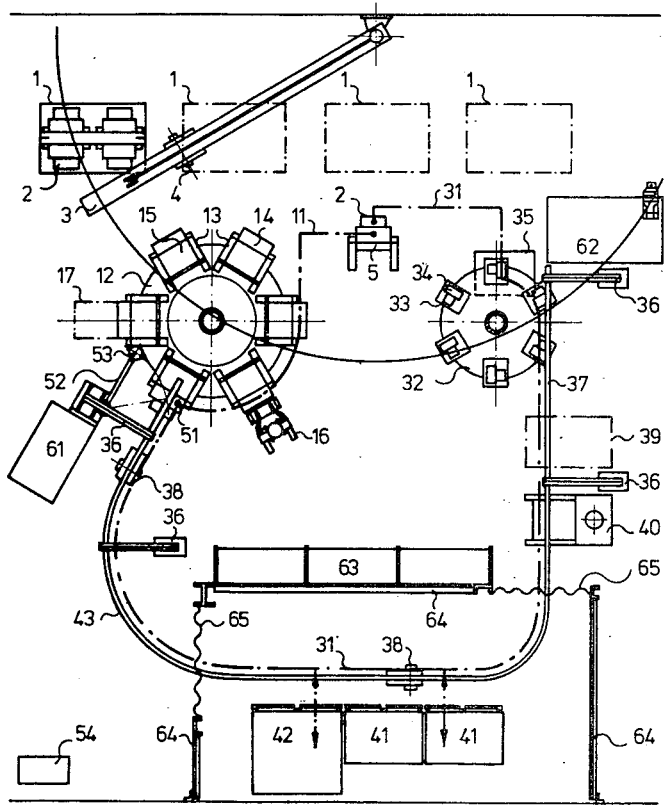

What is claimed is:

1. A clutch assembly-disassembly tool in combination with a fluid-actuated type clutch having an internally splined drum affixed to a first rotatable transmission member, an externally splined hub affixed to a second rotatable transmission member, and a plurality of interleaved friction plates splined alternately to said hub and drum wherein said friction plates are confined between an annular end plate located via a retainer ring in a retainer ring groove in the splined inner peripheral surface of said drum and a fluid pressure actuated piston which serves to press said friction plates together thereby connecting said hub and drum for conjoint rotation, said piston being biased in a direction away from said friction plates via a piston return spring confined between said piston and an annular spring retainer cup secured against axial movement via a snap ring located in a peripheral snap ring groove of said first rotatable transmission member, wherein said assembly-disassembly tool is utilized for compressing said piston return spring to permit the ready insertion or removal of said snap ring during the absence of said end plate and friction plates, said assembly-disassembly tool comprising:
   a. an outer annular member being adapted to fit within said internally splined drum;
   b. an externally expanding split retainer ring adapted to fit into said retainer ring groove and function to restrain said outer annular member against axial movement out of said drum;
   c. an inner annular member fitting within said outer annular member and seating on said annular spring retainer cup; and
   d. means for displacing said inner annular member axially inwardly within said drum, relative to said outer annular member, thereby compressing and axially displacing said spring so as to permit ready removal or insertion of said snap ring relative to said snap ring groove.

2. The combination of claim 1 wherein said outer annular member is provided with external splines that are adapted to intermesh with said internally splined drum so as to locate said outer annular member relative to said drum as well as to prevent said outer annular member from rotating.

3. The combination of claim 1 wherein the adjacent end portions of said externally expanding split retainer ring are provided with a pair of parallel and axially extending grip portions that allow ready manual manipulation of said split retainer ring.

4. The combination of claim 1 wherein said inner annular member is provided with a flange portion that surrounds said annular spring retainer cup.

5. The combination of claim 1 wherein said means for displacing said spring comprises:
   a. a pair of first support members projecting outwardly from said outer annular member;
   b. a first bridging member for rigidly joining the outer extremities of said first support members;
   c. a pair of second support members projecting outwardly from said inner annular member;
   d. a second bridging member for rigidly joining the outer extremities of said second support members inwardly of said first bridging member; and
   e. a threaded bolt extending through said first bridging member and impinging on said second bridging member wherein rotary movement of said bolt in an inwardly direction will axially displace said inner annular member away from said outer annular member and thereby compress said piston return spring.

6. For use with a fluid-actuated type clutch having an internally splined drum affixed to a first rotatable transmission component and an externally splined hub affixed to a second rotatable transmission component, and a plurality of interleaved friction plates splined alternately to said hub and drum wherein said friction plates are confined between an annular end plate located via a retainer ring in a retainer ring groove in the splined inner peripheral surface of said drum and a fluid pressure actuated piston which serves to press said friction plates together thereby connecting said first and second transmission components for conjoint rotation, said piston being biased in a direction away from said friction plates via a piston return spring confined between said piston and an annular spring retainer cup secured against axial movement via a snap ring located in a snap ring groove of said first rotatable transmission component; a clutch assembly-disassembly tool for compressing said piston return spring so as to permit ready removal or insertion of said snap ring during the absence of said end plate and said friction plates, said tool comprising:

a. an outer annular member having external splines and being adapted to fit within and intermesh with said internally splined drum;

b. an externally expanding split retainer ring adapted to fit within said retainer ring groove for restraining said outer annular member against axial movement out of said drum, wherein the adjacent end portions of said split retainer ring are provided with a pair of parallel and axially extending grip portions so as to permit ready manual handling thereof;

c. an inner annular member fitting within said outer annular member and adapted to seat on said annular spring retainer cup; and d. means for displacing said inner annular member axially inwardly relative to said outer annular member thereby compressing and axially displacing said piston return spring so as to permit ready access to said snap ring.

7. The clutch assembly-disassembly tool of claim 6 wherein said means for displacing comprises:

a. a pair of first support members projecting outwardly from said outer annular member;

b. a first bridging member for rigidly joining the outer extremities of said first support members;

c. a pair of second support members projecting outwardly from said inner annular member;

d. a second bridging member for rigidly joining the outer extremities of said second support members inwardly of said first bridging member; and e. a threaded bolt extending through said first bridging member and impinging on said second bridging member wherein rotary movement of said bolt in an inwardly direction will axially displace said inner annular member away from said outer annular member and thereby compress said piston return spring.

* * * * *

United States Patent [19]

Tinnes et al.

[11] 4,092,771
[45] June 6, 1978

[54] PROCESS AND APPARATUS FOR RENEWING SLIDING GATE VALVE UNITS FOR CASTING LADLES

[75] Inventors: Bernhard Tinnes, Zollikerberg; Franz Ruckstuhl, Schwerzenbach, both of Switzerland

[73] Assignee: Metacon AG, Zurich, Switzerland

[21] Appl. No.: 771,692

[22] Filed: Feb. 24, 1977

Related U.S. Application Data

[63] Continuation-in-part of Ser. No. 580,516, May 23, 1975, abandoned.

[30] Foreign Application Priority Data

Mar. 27, 1974 Switzerland .......................... 7215/74

[51] Int. Cl.² .................. B23P 7/00; B23P 19/04; B23P 25/00
[52] U.S. Cl. .................. 29/401 F; 29/426; 29/722; 29/792; 29/793; 29/800
[58] Field of Search ........... 29/401 R, 401 F, 426, 29/430, 469, 722, 783, 785, 786, 791–793, 800

[56] References Cited

U.S. PATENT DOCUMENTS

| | | | |
|---|---|---|---|
| 2,405,544 | 8/1946 | Anjeskey | 29/430 |
| 2,850,775 | 9/1958 | Northington, Jr., et al. | 29/791 |

OTHER PUBLICATIONS

Leach, Thomas J., "Automated Assembly of Alloy Junction Transistors" From *Electronics*, Mar. 25, 1960, pp. 57–61.

*Primary Examiner*—C.W. Lanham
*Assistant Examiner*—Daniel C. Crane
*Attorney, Agent, or Firm*—Cushman, Darby & Cushman

[57] ABSTRACT

Casting ladle gate valves of the type which are designed to be installed and removed from the ladle as a unit, are rebuilt in a work area which includes a disassembly station, a first assembly line including a revolving table for renewing the movable slide parts and a second assembly line including a revolving table for renewing the slide housings, and reassembling the slide parts, slide housings and clamping lids into renewed gate valve units. By preference, the disassembly station, both revolving tables and a conveyor for carrying the units to the work area from the foundry or steel work, and back are served by a slewing crane.

8 Claims, 5 Drawing Figures